(12) United States Patent
Tanno

(10) Patent No.: US 7,140,412 B2
(45) Date of Patent: Nov. 28, 2006

(54) PNEUMATIC TIRE AND TIRE CAVITY RESONANCE SUPPRESSION DEVICE

(75) Inventor: Atsushi Tanno, Hiratsuka (JP)

(73) Assignees: The Yokohama Rubber Co., Ltd., Tokyo (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 211 days.

(21) Appl. No.: 10/806,268

(22) Filed: Mar. 23, 2004

(65) Prior Publication Data

US 2005/0211358 A1  Sep. 29, 2005

(51) Int. Cl.
  *B60C 5/12* (2006.01)
  *B60C 5/00* (2006.01)
  *B60C 19/00* (2006.01)
(52) U.S. Cl. .................... 152/450; 152/157
(58) Field of Classification Search ............ 152/540, 152/157, 450
  See application file for complete search history.

(56) References Cited

U.S. PATENT DOCUMENTS 6,343,843 B1 * 2/2002 Nishikawa .............. 152/450 X

2001/0007268 A1 * 7/2001 Yukawa et al.

FOREIGN PATENT DOCUMENTS

| EP | 1 092 567 A2 | * | 4/2001 |
| JP | 06106903 A | * | 4/1994 |
| JP | 09086113 A | * | 3/1997 |
| JP | 2000062408 A | * | 2/2000 |
| WO | WO-02/085648 A1 | * | 10/2002 |

* cited by examiner

Primary Examiner—Adrienne C. Johnstone
(74) Attorney, Agent, or Firm—Rader, Fishman & Grauer PLLC

(57) ABSTRACT

Disclosed are a pneumatic tire and a tire cavity resonance suppression device in which noise by cavity resonance is effectively reduced without any changes in tire and rim production facilities. The pneumatic tire is constituted by that an object, which is changed in sectional area in accordance with a position in a tire circumferential direction, is fixed to a tread inner surface by a ring-shaped jig made of an elastic body. The tire cavity resonance suppression device includes an object changed in sectional area in accordance with a position in a tire circumferential direction and a ring-shaped jig made of an elastic body for locking the object to a tread inner surface of the tire.

19 Claims, 3 Drawing Sheets

PNEUMATIC TIRE AND TIRE CAVITY RESONANCE SUPPRESSION DEVICE

BACKGROUND OF THE INVENTION

The present invention relates to a pneumatic tire and a tire cavity resonance suppression device, and more particularly, to a pneumatic tire and a tire cavity resonance suppression device in which noise caused by cavity resonance is effectively reduced.

A cavity resonance phenomenon that occurs in a cavity formed between a tire and a wheel rim is a major factor of tire noise. For example, the cavity resonance phenomenon is concerned with noise around 250 Hz regularly heard during traveling or impulsive sound generated driving over gaps or the like of on a road.

As a technique for reducing noise caused by such a cavity resonance phenomenon, addition of a sound absorbing material in the tire to absorb resonance sound, and fixing of a shield to the rim to subdivide the cavity have been proposed. However, since the sound absorbing material is not basically designed to suppress the generation of cavity resonance, a sufficient noise reduction effect cannot be obtained by the sound absorbing material that can be fixed in the tire in practice. Besides, the fixing of the shield to the rim has a problem that rim assembling performance is deteriorated.

On the other hand, there has recently been made a proposal that a sectional shape of the cavity is changed in a tire circumferential direction to constantly change a resonance frequency with rotation of a wheel, whereby the cavity resonance sound is effectively reduced only by a slight improvement. However, a change in a structure of the tire or the rim is required in this method. Thus, production facilities must be greatly changed. Moreover, it is difficult to apply the method to the existing tires or rims.

SUMMARY OF THE INVENTION

A purpose of the present invention is to provide a pneumatic tire and a tire cavity resonance suppression device in which noise by cavity resonance can be effectively reduced without any changes in tire and rim production facilities.

In order to achieve the purpose, the pneumatic tire of the present invention is characterized in that an object changed in sectional area in accordance with a position in a tire circumferential direction is fixed to a tread inner surface by a ring-shaped jig made of an elastic body.

Additionally, in order to achieve the purpose, the tire cavity resonance suppression device of the present invention is characterized by comprising an object changed in sectional area in accordance with a position in a tire circumferential direction, and a ring-shaped jig made of an elastic body for locking the object to a tread inner surface of the tire.

According to the present invention, the object changed in sectional area in accordance with the position in the tire circumferential direction is housed in a cavity of the tire and fixed to the tread inner surface by the ring-shaped jig. Accordingly, a cavity resonance frequency is constantly changed with rotation of the tire to shorten time of resonance at the same frequency. Thus, it is possible to effectively reduce noise caused by cavity resonance. Moreover, the invention can be applied to existing tires without any changes in tire and rim production facilities.

According to the invention, in order to effectively reduce noise caused by cavity resonance, when a cavity is formed inside of the tire while the tire is fixed to a standard rim, a sectional area changing rate of the cavity in the tire circumferential direction is preferably set in a range of 0.25% to 40% with respect to a maximum sectional area of the cavity. Further, a circumference of the jig is preferably variable to be suited to many kinds of tires with different sizes.

DETAILED DESCRIPTION OF THE PREFERRED EMBODIMENT

Hereinafter, the constitution of the present invention will be described in detail with reference to the accompanying drawings.

Figure 1:
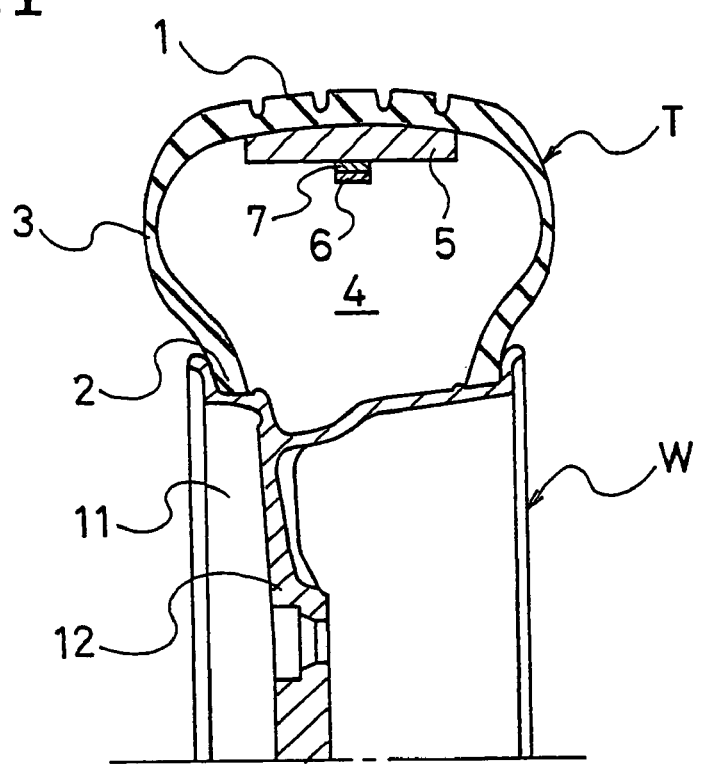
FIG. 1 is a meridian sectional view showing a pneumatic tire equipped with a tire cavity resonance suppression device according to an embodiment of the present invention together with a wheel.

FIG. 1 shows a pneumatic tire equipped with a tire cavity resonance suppression device according to an embodiment of the present invention. In FIG. 1, a pneumatic tire T comprises a tread portion 1, a pair of left and right bead portions 2, and sidewall portions 3 for interconnecting the tread portion 1 and the bead portions 2. Meanwhile, a wheel W comprises a rim 11 to which the bead portions 2, 2 of the tire T are fixed, and a disk 12 for connecting the rim 11 to an axle (not shown). When the tire T is fixed to the wheel W, a cavity 4 is formed therebetween.

Figure 2:
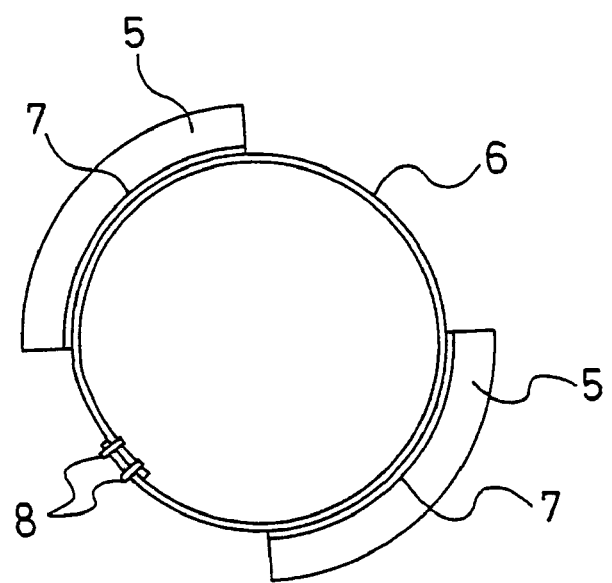
FIG. 2 is a side view showing the tire cavity resonance suppression device according to the embodiment of the invention.

In the cavity 4, an object 5 changed in sectional area in accordance with a position in a tire circumferential direction is fixed to an inner surface of the tread portion 1 by a ring-shaped jig 6 extended in the tire circumferential direction. That is, as shown in FIG. 2, a plurality of objects 5 are discontinuously arranged in the tire circumferential direction. In a part in which the object 5 is present, a sectional area thereof in a tire meridian section has an arbitrary value. In a part in which no object 5 is present, a sectional area thereof in a tire meridian section is 0 ($mm^2$). The objects 5 are arranged at equal intervals at two places or more in the tire circumferential direction, more preferably at two to four places. However, the object may be continuously extended in the tire circumferential direction, and a sectional area may be changed in accordance with a position in the tire circumferential direction. In such a case, sectional areas of the object 5 only need be changed at equal intervals at two or more places in the tire circumferential direction, more preferably at two to four or more places.

It is preferred that the object 5 be made of a low specific gravity material with an apparent specific gravity of 0.1 or lower, more preferably 0.05 or lower, and further preferably 0.005 or lower. That is, a large specific gravity of the object 5 is unfavorable because mass unbalance occurs in the tire T, and balance weight for adjusting the unbalance becomes excessive. Even when an apparent specific gravity is set to 0.005 or lower, a satisfactory noise reduction effect can be exhibited by covering a surface of the object 5 with a thin film of an elastic modulus 1 MPa or higher. As such a low specific gravity material, foamed resin (sponge) or the like is available.

The jig 6 is constituted by forming a band material made of an elastic body into a ring shape and bonding both ends thereof. Preferably, this jig 6 is made of a light material, but it is at least required to follow up deformation of the tire T, and to give no substantial adverse effects to tire performance such as ride comfort. Thus, a material with an elastic modulus 200 to 1500 MPa is preferably used for the jig 6. For example, plastic such as nylon resin can be used.

Figure 3:
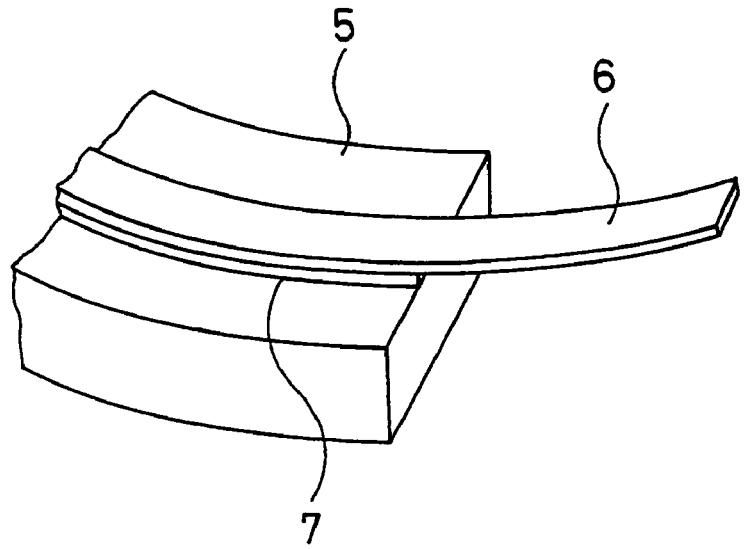
FIG. 3 is a perspective view showing a main section of the tire cavity resonance suppression device according to the embodiment of the invention.

As shown in FIG. 3, the jig 6 slides on a rail 7 fixed to the object 5. An outer diameter of the jig 6 is set smaller than an inner diameter of the tread portion 1, but larger than an inner diameter of the object 5. Accordingly, the object 5 is arranged in an arbitrary position of a circumferential direction of the jig 6 and pressed to the inner surface of the tread portion 1 based on an elastic force of the jig 6, whereby the object 5 can be fixed in the tire T. When the object 5 is fixed, an adhesive is preferably disposed between the inner surface of the tread portion 1 and the object 5. However, the adhesive is not always necessary.

Figure 4:
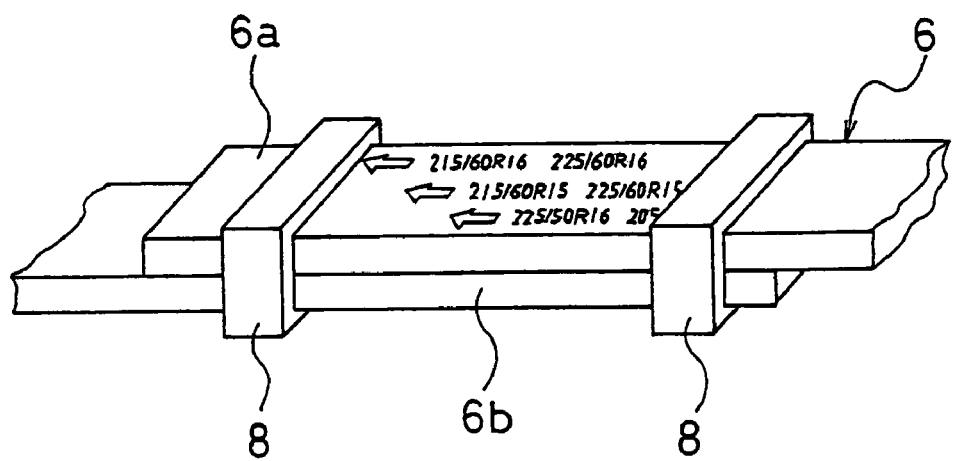
FIG. 4 is a perspective view showing the other main section of the tire cavity resonance suppression device according to the embodiment of the invention.

As shown in FIG. 4, both ends 6a, 6b of the jig 6 are bonded by a one or more fastening bands 8, 8. Concave and convex parts or the like (not shown) are formed on fitting surfaces of both ends 6a, 6b to mesh with each other, and positioning is carried out by the mesh between these concave and convex parts or the like. Additionally, a circumference of the jig 6 can be changed by adjusting a superposing length of both ends 6a, 6b to be suited to various tire sizes. A bonded part of the jig 6 may be at one place as shown in the drawing. In consideration of mass balance, however, a plurality of places may be set for bonding, and arranged at equal intervals in the tire circumferential direction.

As described above, the object 5 changed in sectional area in accordance with a position in the tire circumferential direction is housed in the cavity 4 of the tire T and fixed to the inner surface of the tread portion 1 by the ring-shaped jig 6. Accordingly, an area of a tire meridian section of the cavity 4 is changed in the tire circumferential direction, and a cavity resonance frequency is constantly changed with rotation of the tire to shorten time of resonance at the same frequency. As a result, it is possible to effectively reduce noise caused by cavity resonance of about 200 Hz to 250 Hz, which has conventionally been a problem.

Additionally, the tire cavity resonance suppression device constituted of the object 5 and the jig 6 is fixed to the tire T after the tire T is vulcanized. Thus, the device can be applied to the existing tires without any changes in tire and rim production facilities. Especially, by making a circumference of the jig 6 variable, a common tire cavity resonance suppression device can be used for many kinds of pneumatic tires. Further, the tire cavity suppression device will never interfere with rim assembling since the device is fixed to the inner surface of the tread portion 1 of the tire T.

In the aforementioned pneumatic tire, while the section area of the cavity 4 in the tire meridian section is made nonuniform in the tire circumferential direction by the arrangement of the object 5. A sectional area changing rate of the cavity 4 formed inside of the tire in the tire circumferential direction, while the tire is fit to a standard rim, is preferably set to 0.25% to 40%, more preferably 0.25% to 15%, further preferably 0.25% to 2.5% with respect to a maximum sectional area thereof (sectional area of a part to which the object 5 is not fixed). If this sectional area changing rate is too small, a noise reduction effect becomes unsatisfactory. On the contrary, if the rate is too large, further noise reduction effects cannot be obtained, leading to an increase in mass.

The object 5 housed in the cavity 4 can be used as a counterbalance for adjusting mass unbalance of a tire itself. That is, while the tire T generally has inevitable mass unbalance, the object 5 can be effectively used as a counterbalance by being arranged in a portion with a relative mass shortage in the circumferential direction of the tire T.

According to the embodiment, the object for changing the sectional area of the tire cavity is arranged on the outer peripheral side of the ring-shaped jig. However, there is no particular limitation on a positional relationship between the jig and the object in a tire diameter direction. For example, the object may be arranged on the inner peripheral side of the ring-shaped jig, or both inside and outside the ring-shaped jig. In both forms, the object only needs be fixed to the tread inner surface by the ring-shaped jig.

The preferred embodiment of the present invention has been described in detail hereinbefore. However, it should be understood that various changes, modifications and substitutions can be made without departing from the spirit and scope of the invention defined in the appended claims.

EXAMPLE

Regarding a pneumatic tire of a size 165/65R15, a conventional tire and a tire of the invention were manufactured by changing only cavity conditions as follows.

Conventional tire:
Nothing was arranged in the cavity.
Tire of the invention:
A plurality of objects (see FIGS. 1, 2) were fixed to a tread inner surface at equal intervals in a tire circumferential direction by using a ring-shaped jig made of an elastic body, and a sectional area changing rate of the cavity was 5.0% in the tire circumferential direction.

These tires were fit to wheels of rim sizes 15×5J, and axial force response levels [dB(N)] in a frequency range of 0 Hz to 350 Hz were obtained at axle positions by an impulse excitation method. The results are shown in FIG. 5.

Figure 5:
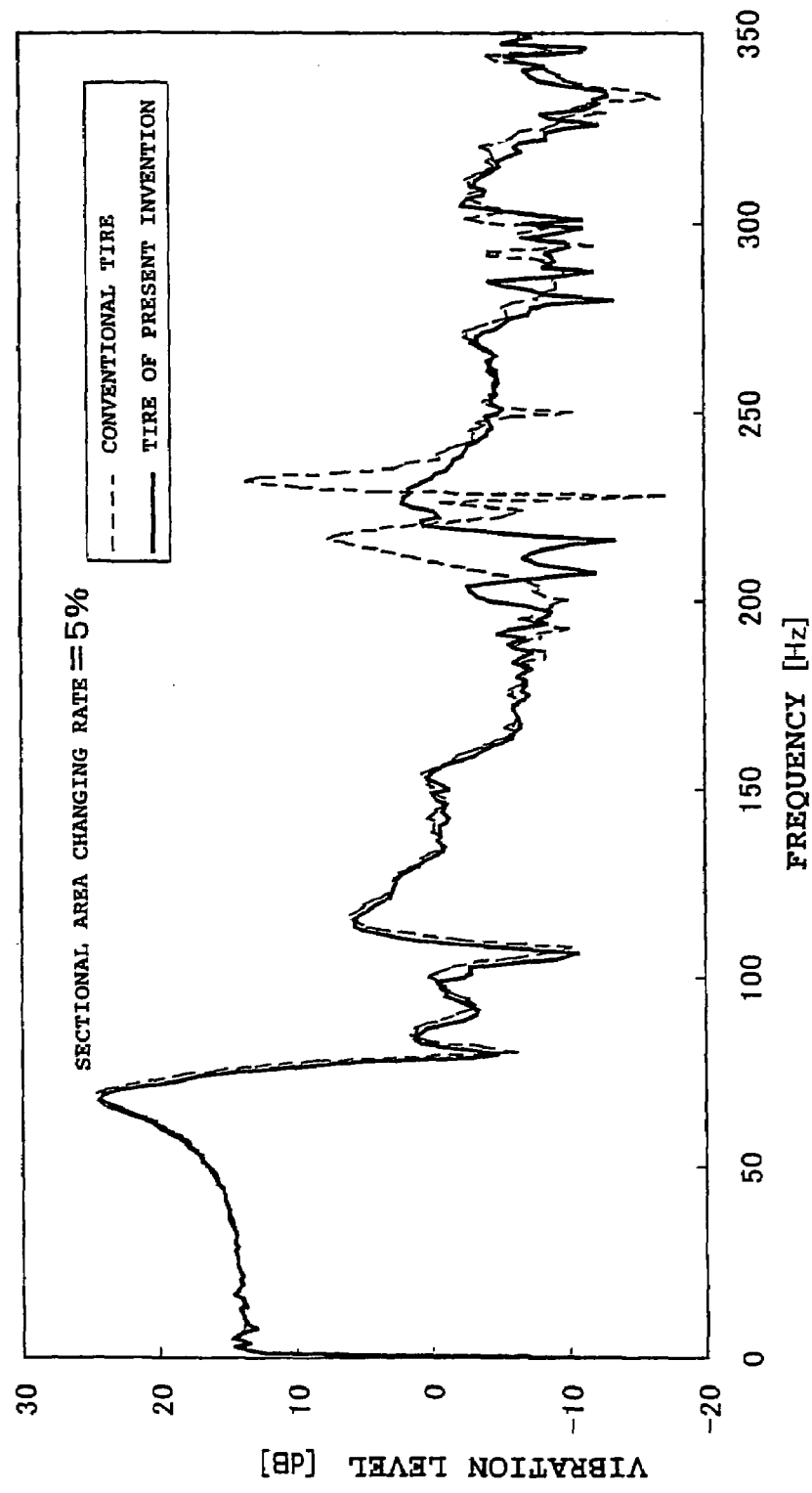
FIG. 5 is a graph showing a relationship between a frequency and vibration transmissibility.

As shown in FIG. 5, cavity resonance sound is generated in a band of about 200 Hz to 250 Hz in the conventional tire while cavity resonance sound is greatly reduced in the same band in the tire of the invention.

According to the present invention, since the object changed in sectional area in accordance with a position in the tire circumferential direction is fixed to the tread inner surface by the ring-shaped jig made of the elastic body, it is possible to effectively reduce noise by cavity resonance without any changes in tire and rim production facilities.

What is claimed is:

1. A pneumatic tire, comprising:
   an object fixed to a tread inner surface by a ring-shaped jig made of an elastic body, the object being changed in sectional area in accordance with a position in a tire circumferential direction,
   wherein the object comprises a foamed resin, and
   wherein the object is pressed on a tread inner surface by elastic force exerted by a jig having an elastic modulus of 200 to 1500 Mpa.

2. The pneumatic tire according to claim 1, wherein a cavity is formed inside of the tire while the tire is fixed to a rim.

3. The pneumatic tire according to claim 2, wherein a circumference of the jig is variable.

4. The pneumatic tire according to claim 1, wherein a cavity is formed inside of the tire while the tire is fixed to a standard rim, and a sectional area changing rate of the cavity in the tire circumferential direction is set in a range of 0.25% to 40% with respect to a maximum sectional area of the cavity.

5. The pneumatic tire according to claim 4, wherein a circumference of the jig is variable.

6. The pneumatic tire according to claim 1, wherein the jig is adapted to slide on a rail, the rail being fixed to the object.

7. The pneumatic tire according to claim 1, wherein, in the tire width direction, the width of jig is smaller than the width of the object.

8. The pneumatic tire according to claim 1, wherein an adhesive is disposed between the inner surface of the tread portion and the object.

9. The pneumatic tire according to claim 1, wherein the foamed resin is a low specific gravity material with an apparent specific gravity of 0.1 or lower.

10. The pneumatic tire according to claim 1, wherein one end of the jig is in contact with another end of the jig.

11. The pneumatic tire according to claim 10, wherein at least one fastening band bonds said one end of the jig to said another end of the jig.

12. The pneumatic tire according to claim 1, wherein a circumference of the jig is variable.

13. The pneumatic tire according to claim 12, wherein a cavity is formed inside of the tire while the tire is fixed to a rim.

14. The pneumatic tire according to claim 12, wherein the jig is adapted to slide on a rail, the rail being fixed to the object.

15. The pneumatic tire according to claim 12, wherein, in the tire width direction, the width of jig is smaller than the width of the object.

16. The pneumatic tire according to claim 12, wherein an adhesive is disposed between the inner surface of the tread portion and the object.

17. The pneumatic tire according to claim 12, wherein the foamed resin is a low specific gravity material with an apparent specific gravity of 0.1 or lower.

18. The pneumatic tire according to claim 12, wherein one end of the jig is in contact with another end of the jig.

19. The pneumatic tire according to claim 18, wherein at least one fastening band bonds said one end of the jig to said another end of the jig.

* * * * *